United States Patent [19]

Chien

[11] Patent Number: 5,956,436
[45] Date of Patent: Sep. 21, 1999

[54] METHOD FOR DYNAMICALLY SCANNING AN IMAGE

[75] Inventor: Chun-Tsai Chien, Taoyuan, Taiwan

[73] Assignee: Umax Data Systems Inc., Hsinchu, Taiwan

[21] Appl. No.: 08/862,971

[22] Filed: May 23, 1997

[51] Int. Cl.⁶ .................................................. G06K 9/20
[52] U.S. Cl. ........................................................... 382/312
[58] Field of Search ................................. 382/131, 168, 382/169, 170, 171, 172, 254, 260, 312, 318

[56] References Cited

U.S. PATENT DOCUMENTS

| | | | |
|---|---|---|---|
| 4,360,885 | 11/1982 | Edgar | 382/131 |
| 5,265,200 | 11/1993 | Edgar | 382/172 |
| 5,267,329 | 11/1993 | Ulich et al. | 382/260 |
| 5,608,543 | 3/1997 | Tamagaki et al. | 382/254 |
| 5,781,668 | 7/1998 | Starkweather | 382/318 |

*Primary Examiner*—Jose L. Couso
*Attorney, Agent, or Firm*—Harness, Dickey & Pierce, P.L.C.

[57] ABSTRACT

A method for dynamically scanning an image is disclosed. The present invention substantially improves the quality of the image according to specific distribution of the gray levels. In one embodiment, an image is first scanned using a set of parameters to generate a first image. The compositional distribution of the first image is then analyzed. If a predetermined amount of the compositional distribution of the first image does not lie within a predetermined range, then at least one parameter is adjusted. Next, the image is secondly scanned using the adjusted set of parameters to generate a second image. Finally, the first image and the second image are combined or added to generate a composite image so that at least the predetermined amount of the compositional distribution lies within the predetermined range.

13 Claims, 4 Drawing Sheets

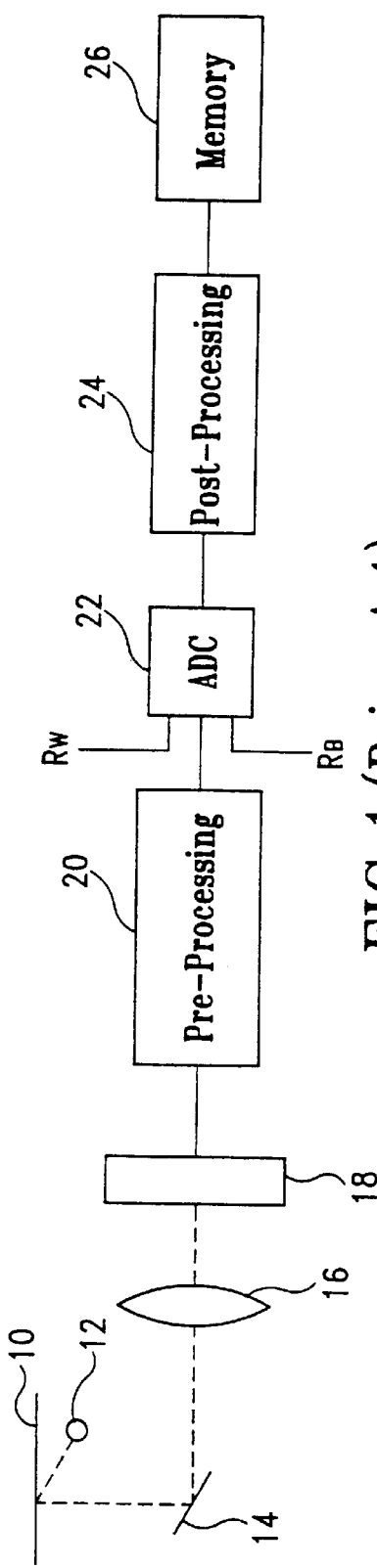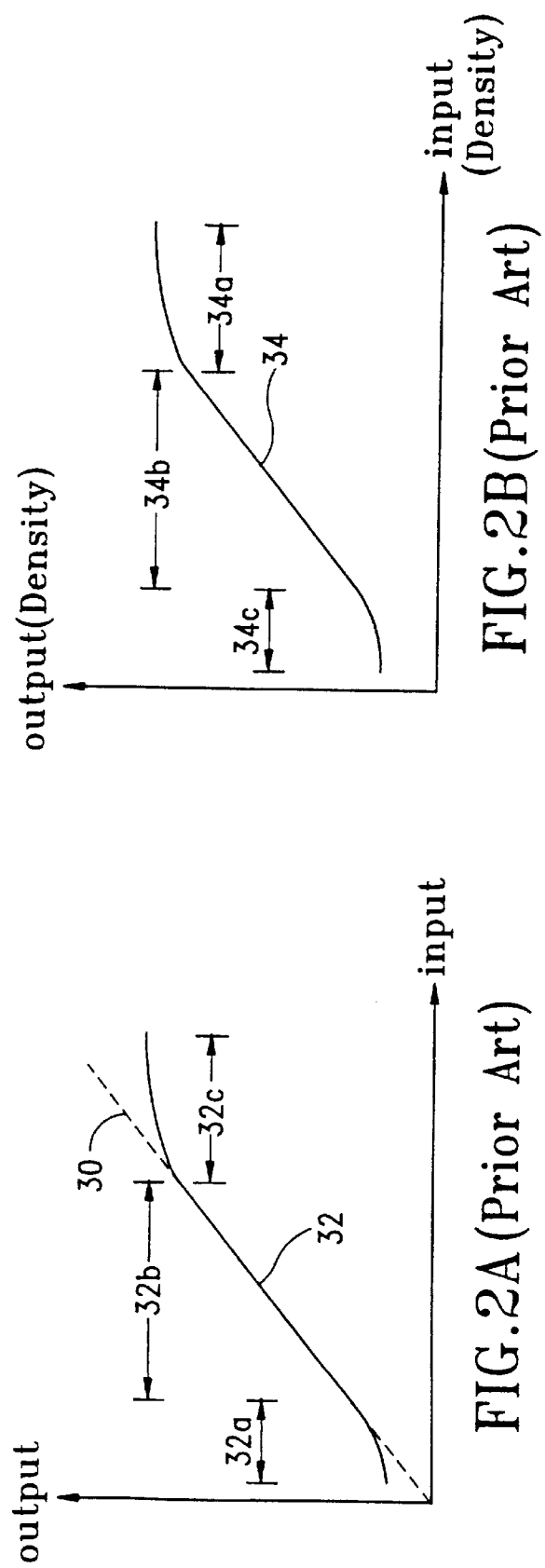

METHOD FOR DYNAMICALLY SCANNING AN IMAGE

BACKGROUND OF THE INVENTION

1. Field of the Invention

The present invention relates to an image processing system, and particularly to a method for dynamically scanning an image.

2. Description of the Prior Art

An image signal processing system electrically generates an image signal through focusing a scanned light beam and using a photodetecting device such as charge-coupled devices (CCDs). The generated image signal is then further processed, stored and displayed for some applications. Image scanners, camera recorders and facsimile machines are some examples among the widespread applications of the image signal processing systems in modem offices and home.

A functional block diagram of a conventional image system is shown in FIG. 1. An image of a document 10, which is illuminated by a lamp 12 and reflected by a mirror 14, is focused by at least a set of lens 16. The focused image is then detected by a CCD 18, followed by being processed via a pre-processing circuit 20 such as a direct current (DC) gain amplifier, which is usually implemented by an operational amplifier. Thereafter, the pre-processed signal is transformed from its analog form to an equivalent digital form by an analog-to-digital converter (ADC) 22. A black reference input $R_B$ and a white reference input $R_w$ are input to the ADC 22 to adjust the range of the system response. The digitized signal is further processed by a post-processing circuit 24, such as a Gamma correction, and is then stored in a memory buffer 26 for further processing or display.

Density range is one of the important performance parameters of an image processing system such as a scanner. This density range is closely related to a signal-to-noise (S/N) ratio in the system. For example, a scanned image having a density range of two (2) can be distinguished only provided that a S/N ratio is greater than 100 (i.e., $10^2$). Generally, an image processing system is said to have a density range D if the S/N ratio in the system is greater than $10^D$. The S/N ratio mentioned above is primarily determined by a S/N ratio of a charge-coupled device (CCD) and/or a S/N ratio of the other portion ofthe system. For a digital image processing system, the S/N ratio is related to the number of system bits. For example, for a system having 256 levels of gray, its S/N ratio becomes 256, and its density range D thus becomes 2.4 (i.e., log 256).

For the conventional image processing system as described in connection with FIG. 1, unfortunately the image signal processed by the system is usually distorted by the non-linearity of some devices, such as the operational amplifier 20 and the CCD 18. A characteristic response of a conventional CCD is shown in FIG. 2A, where X axis represents the reflectivity or light intensity received by the CCD, and Y axis represents the output voltage of the CCD. Dashed line 30 indicates an ideal linear response of the CCD, and curve 32 shows the response of a commercial CCD device. Section 32a on the curve 32 shows the dark portion of the image, and section 32c shows the bright portion of the image. As can be seen from the diagram, only section 32b on the curve 32 possesses a linear response.

FIG. 2B further shows a response of system density where the input density and the output density are represented by X axis and Y axis respectively. Section 34a on the response curve 34 shows the dark portion of the image and section 34c shows the bright portion of the image. Further, section 34b on the curve 34 has a linear response.

For the conventional image processing system as described above and shown in FIG. 1, most parameters for performing scan are fixed, or at least not conveniently adjustable. These parameters include exposure time, intensity of the exposure, reflectivity to the CCD 18, value of the dc gain amplifier 20, black reference and white reference inputs to the ADC 22, value of Gamma in the post-processing circuit 24, or highlight/shadow in the post-processing circuit 24.

FIG. 3 is a histogram (or spectrum) illustrating two worst-case examples, where the value on the X axis represents the level of gray, and the value on the Y axis represents the total count of occurrence for a specific gray level. Curve 36 indicates a dark image and curve 38 indicates a bright image. However, the conventional image processing system scans these two images with the same scan parameter, resulting in a poor scan on both images.

SUMMARY OF THE INVENTION

In accordance with the present invention, a method is provided for dynamically scanning an image to substantially improve the quality of the image according to specific distribution of the gray levels. In one embodiment, an image is first scanned using a set of parameters to generate a first image. The compositional distribution of the first image is then analyzed. If a predetermined amount of the compositional distribution of the first image does not lie within a predetermined range, then at least one parameter (for example, the exposure time) is adjusted. For example, in the case of scanning a dark image, the exposure time is lengthened. Next, the image is secondly scanned using the adjusted set of parameters to generate a second image. Finally, the first image and the second image are combined or added to generate a composite image, so that at least the predetermined amount of the compositional distribution lies within the predetermined range.

BRIEF DESCRIPTION OF THE DRAWINGS

FIG. 1 shows a functional block diagram of a conventional image system;

FIG. 2A shows a characteristic response of a conventional CCD;

FIG. 2B shows a response of system density;

DESCRIPTION OF THE PREFERRED EMBODIMENT

Figure 4:
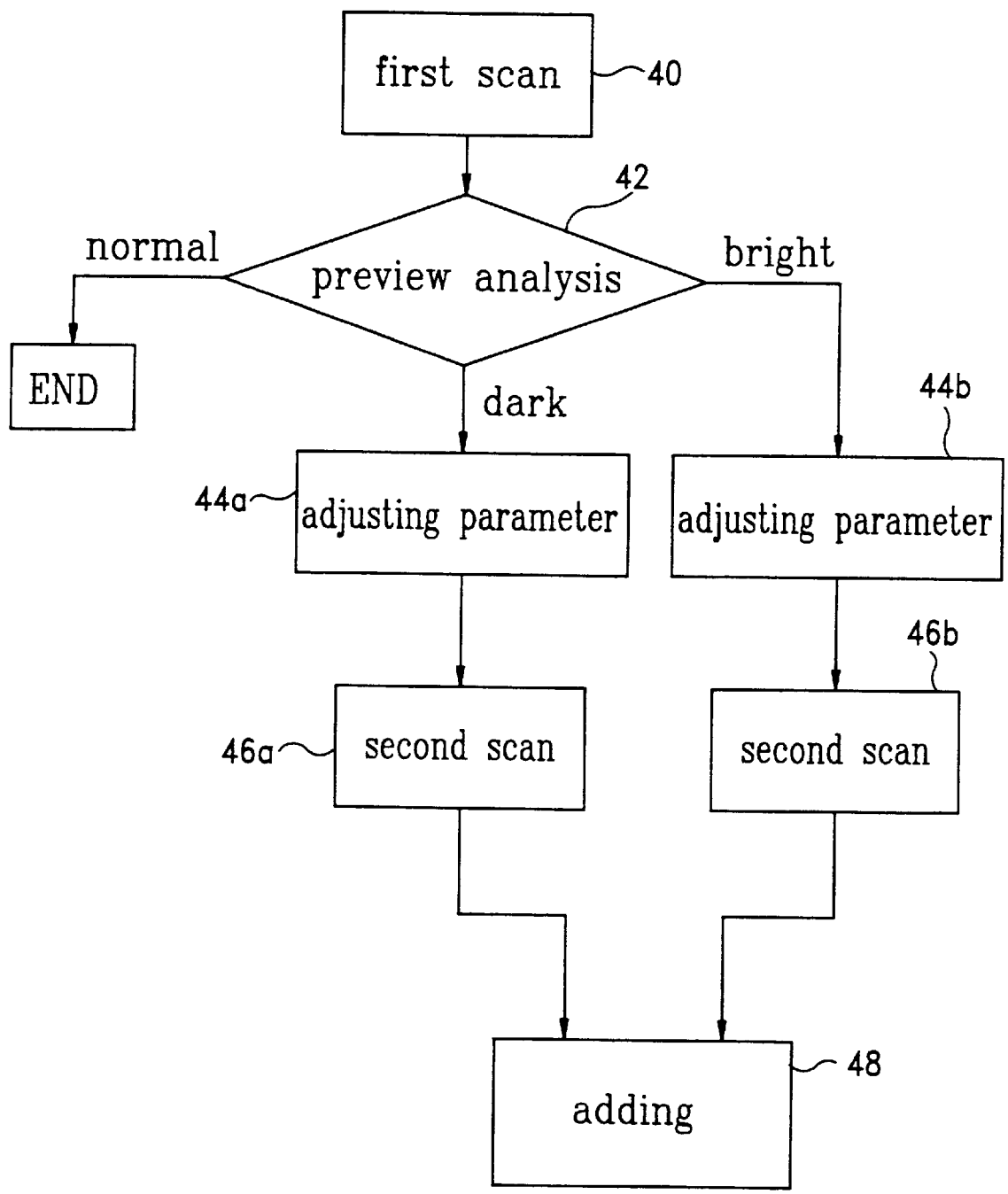
FIG. 4 shows a flow diagram of scanning an image in accordance with one embodiment of the present invention.
Figure 5:
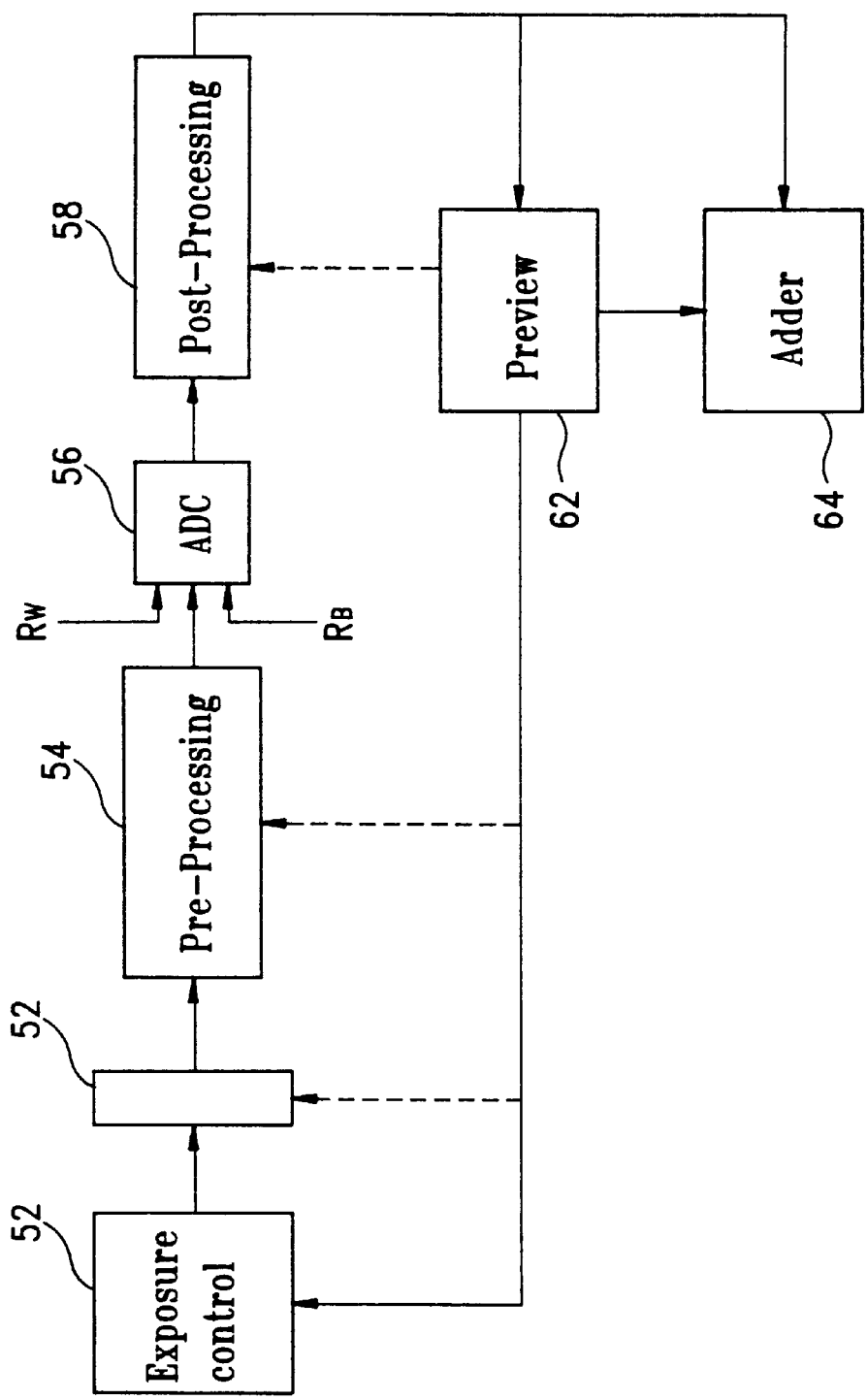
FIG. 5 shows a block diagram in connection with FIG. 4.

FIG. 4 shows a flow diagram of scanning an image in accordance with one embodiment of the present invention. FIG. 5 shows a corresponding block diagram of this embodiment. Referring to FIG. 4, a normal scan is performed in step 40 in which operating parameters the same as those of a conventional image processing system are used. Referring to FIG. 5, an exposure control means 50 is used to control the reflectivity of an image received by a CCD 52. The output of the CCD 52 is processed by a pre-processing circuit 54, such as a dc gain amplifier. The processed signal from the pre-processing circuit 54 has an analog form which is then transformed to an equivalent digital form by an analog-to-digital converter (ADC) 56. This ADC circuit 56 usually has two reference input signals, i.e., a black reference $R_B$ and a white reference $R_w$. The digitized signal from the ADC circuit 56 is further processed by a post-processing circuit 58, such as a Gamma circuit. The operating parameters mentioned above include exposure time, intensity of the exposure, reflectivity to the CCD 52, value of the dc gain amplifier 54, black reference and white reference inputs to the ADC 56, value of Gamma in the post-processing circuit 58, and highlight or shadow in the post-processing circuit 58.

Figure 6:
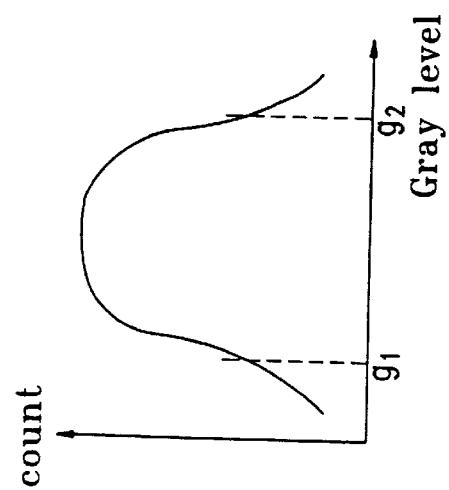
FIG. 6 shows an example of a normal distribution of an image.

The scanned image generated in step 40 is received by a preview means 62, which analyzes (in step 42) the scanned image to determine its distribution of the gray levels. In this embodiment, the preview means 62 is implemented by a program (or a driver) which resides in a portion of the system memory (not shown in this diagram). FIG. 6 shows an example of a normal distribution, where the value on the X axis represents the level of gray and the value on the Y axis represents the total count of occurrence for a specific gray level. As shown in this diagram, most gray levels located in the central portion, which has a linear response. As the outcome of the preview means 62 shows nothing abnormal, the processed image from the post-processing circuit 58 is stored in a memory or is further processed. The normality in this disclosure means that at least a predetermined amount of count lies within a predetermined range, e.g., the range between $g_1$ and $g_2$ in FIG. 6. In this embodiment, the $g_1$ and $g_2$ are respectively 20% and 80% of the maximum system levels of gray.

Figure 3:
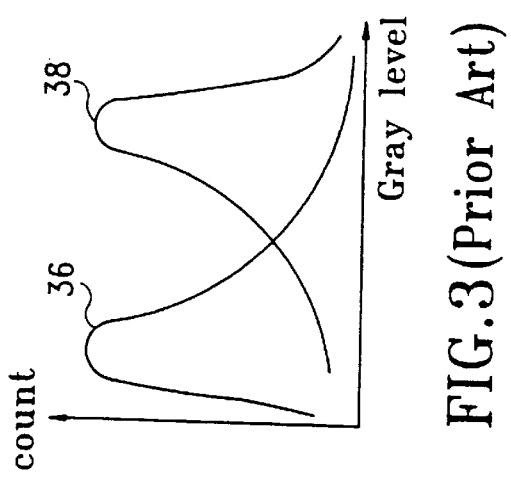
FIG. 3 is a histogram (or spectrum) illustrating two worst-case examples in scanning.

Nevertheless, when the result of the preview means 62 shows something abnormal, such as those shown in FIG. 3, the preview means 62 then adjusts one or more of the aforementioned parameters so that the system can dynamically and automatically adjust itself (in step 44a or 44b) to an optimal operating range, followed by a second scan (in step 46a or 46b). For example, if a dark image is initially scanned and analyzed, the preview means 62 then control the exposure controller 50 to increase the exposure time, thereby dynamically adapting the system to a new response range that suits this dark image. In addition to the adjustment of the exposure time, other parameter can also be adjusted. For exanple, the intensity of a lamp can also be increased. Other parameters can further be adjusted depending on the requirement of the quality of the processed image, although more time is needed.

Next, the second scan (46a in this example) is performed in the same manner as that of the first normal scan, except using different parameter(s). The processed image from the second scan is then added (in step 48) to the stored processed image generated from the first scan, therefore generating a composite image, which has a better response than the conventional scanned image. In this embodiment, the adder 64 is implemented in a program (or driver), which resides in a portion of the system memory (not shown in the diagram). Although the preview means 62 and the adder 64 are implemented in software, it is appreciated, in light of the disclosure, by those skilled in the art that the preview means 62 or the adder 64 can be partially or wholly implemented in a hardware manner.

Figure 7:
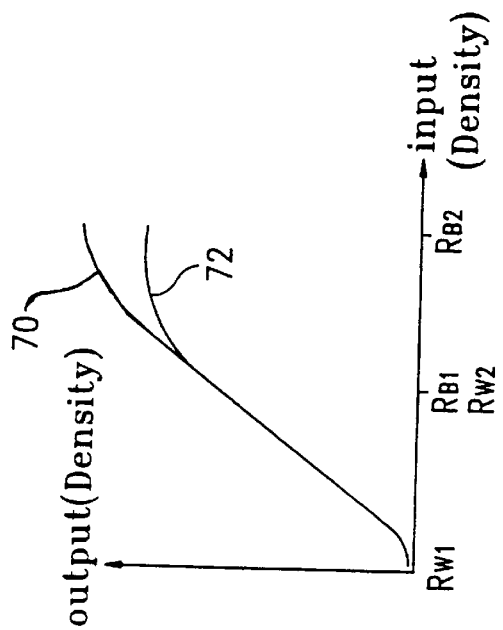
FIG. 7 shows a response of system density, where two sets of reference signals are respectively used for the first and the second scan.

In another embodiment according to the present invention, the image processing system of FIG. 5 is used to overcome the non-linearity problem as described above. Referring to FIG. 7, two sets of reference signals, i.e., $R_{W1}$, $R_{B1}$ and $R_{W2}$, $R_{B2}$ are respectively used for the first and the second scan. The reference signals ($R_{W1}$, $R_{B1}$ are fed to the ADC 56 in step 44a, followed by the first scan 46a. Subsequently, the reference signals ($R_{W2}$, $R_{B2}$) are fed to the ADC 56 in step 44b, followed by the second scan 46b. Finally, these two scanned images are added by the adder 64 in step 48, resulting in an improved response curve 70 compared to an original response curve 72. In this embodiment, the preview means 62 needs not analyze the first scanned image, but only store that image for use later in step 48.

Although specific embodiments have been illustrated and described, it will be obvious to those skilled in the art that various modifications may be made without departing from the spirit which is intended to be limited solely by the appended claims.

What is claimed is:

1. A method for dynamically scanning an image, said method comprising the steps of:

forming an image processing system for scanning the image, said image processing system comprising: a light source for illuminating said image to be scanned, a light detector optically coupled to said light source for detecting said illuminated image, a gain amplifier coupled to said light detector, said gain amplifier being configured to adjust a dc gain of said image, and said gain amplifier having an input for adjusting the dc gain, an analog-to-digital converter coupled to said gain amplifier, said analog-to-digital converter being configured to transform an analog form of said image to a digital form, said analog-to-digital converter having two inputs for receiving a black reference signal and a white reference signal, and a post-processing circuit coupled to said analog-to-digital converter, said post-processing circuit being configured to process said image;

firstly scanning the image using a set of parameters, thereby generating a first image;

analyzing compositional distribution of said first image;

adjusting at least one of the set of parameters when a predetermined amount of the compositional distribution of said first image does not lie within a predetermined range;

secondly scanning the image using the adjusted set of parameters, thereby generating a second image; and adding said first image to said second image, thereby generating a composite image, wherein said composite image has at least said predetermined amount of a plurality of counts each for a corresponding gray level lying within said predetermined range.

2. The method according to claim 1, wherein said compositional distribution comprises a plurality of counts each for a corresponding gray level of the image.

3. The method according to claim 1, wherein said post-processing circuit comprises a Gamma correction circuit for adjusting a Gamma value of the image.

4. The method according to claim 3, wherein said post-processing circuit comprises a highlight/shadow circuit for adjusting gray level of said image, said highlight/shadow circuit having an input for receiving a highlight/shadow signal.

5. The method according to claim 4, wherein said set of parameters comprises exposure time of the light source, intensity of the light source, a value of the dc gain, a value of the black reference signal, a value of the white reference signal, the Gamma value, and the highlight/shadow signal.

6. An improved method for scanning an image, said method comprising the steps of:

forming an image processing system for scanning the image, said image processing system comprising: a light source for illuminating said image to be scanned, a light detector optically coupled to said light source for detecting said illuminated image, a gain amplifier coupled to said light detector, said gain amplifier being configured to adjust a dc gain of said image, and said gain amplifier having an input for adjusting the dc gain, an analog-to-digital converter coupled to said gain amplifier, said analog-to-digital being configured to transform an analog form of said image to a digital form, said analog-to-digital converter having two inputs for receiving a black reference signal and a white reference signal, and a post-processing circuit coupled to said analog-to-digital converter, said post-processing circuit being configured to process said image;

firstly scanning the image using a first set of parameters, thereby generating a first image;

secondly scanning the image using a second set of parameters, thereby generating a second image, wherein at least one in the second set of parameters is different from a corresponding one in the first set of parameters; and adding said first image to said second image, thereby generating a composite image.

7. The method according to claim 6, wherein said post-processing circuit comprises a Gamma correction circuit for adjusting a Gamma value of the image.

8. The method according to claim 7, wherein said post-processing circuit comprises a highlight/shadow circuit for adjusting gray level of said image, said highlight/shadow circuit having an input for receiving a highlight/shadow signal.

9. The method according to claim 8, wherein said set of parameters comprises exposure time of the light source, intensity of the light source, a value of the dc gain, a value of the black reference signal, a value of the white reference signal, the Gamma value, and the highlight/shadow signal.

10. An improved method for scanning an image, said method comprising the steps of:

forming an image processing system for scanning the image, wherein said image is scanned by an image processing system, said image processing system comprising: a light source for illuminating said image to be scanned, a light detector optically coupled to said light source for detecting said illuminated image, a gain amplifier coupled to said light detector, said gain amplifier being configured to adjust a dc gain of said image, and said gain amplifier having an input for adjusting the dc gain, an analog-to-digital converter coupled to said gain amplifier, said analog-to-digital converter being configured to transform an analog form of said image to a digital form, said analog-to-digital converter having two inputs for receiving a black reference signal and a white reference signal, and a post-processing circuit coupled to said analog-to-digital converter, said post-processing circuit being configured to process said image;

firstly scanning the image using a first exposure time, thereby generating a first image;

secondly scanning the image using a second exposure time, thereby generating a second image, wherein the second exposure time is longer than the first exposure time; and adding said first image to said second image, thereby generating a composite image.

11. The method according to claim 10, wherein said post-processing circuit comprises a Gamma correction circuit for adjusting a Gamma value of the image.

12. The method according to claim 11, wherein said post-processing circuit comprises a highlight/shadow circuit for adjusting gray level of said image, said highlight/shadow circuit having an input for receiving a highlight/shadow signal.

13. The method according to claim 12, further comprising a step of adjusting a set of parameters in the second scaming, said set of parameters comprising intensity of the light source, a value of the dc gain, a value of the black reference signal, a value of the white reference signal, the Gamma value, and the highlight/shadow signal.

* * * * *